United States Patent
Parimi et al.

(10) Patent No.: US 10,819,152 B2
(45) Date of Patent: Oct. 27, 2020

(54) WIRELESS POWER TRANSFER SYSTEMS AND COMPONENTS THEREOF

(71) Applicant: The Research Foundation for the State University of New York, Albany, NY (US)

(72) Inventors: Patanjali V. Parimi, Liverpool, NY (US); David E. Senior, Oswego, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 39 days.

(21) Appl. No.: 15/701,112

(22) Filed: Sep. 11, 2017

(65) Prior Publication Data

US 2018/0076668 A1    Mar. 15, 2018

Related U.S. Application Data

(60) Provisional application No. 62/393,141, filed on Sep. 12, 2016.

(51) Int. Cl.
  *H02J 50/12*    (2016.01)
  *H02J 7/02*    (2016.01)
  *H02J 50/40*    (2016.01)

(52) U.S. Cl.
  CPC .............. *H02J 50/12* (2016.02); *H02J 7/025* (2013.01); *H02J 50/40* (2016.02)

(58) Field of Classification Search
  CPC ............. H02J 50/12; H02J 50/40; H02J 7/025
  USPC ........................................................ 307/104
  See application file for complete search history.

(56) References Cited

U.S. PATENT DOCUMENTS

| | | | | |
|---|---|---|---|---|
| 9,673,664 B2* | 6/2017 | Nakamura | ............... | H02J 5/005 |
| 2010/0110741 A1* | 5/2010 | Lin | ......................... | H02J 5/005 |
| | | | | 363/127 |
| 2013/0214612 A1* | 8/2013 | Bae | ....................... | H04B 5/0037 |
| | | | | 307/104 |
| 2014/0152523 A1* | 6/2014 | Wu | ......................... | H01Q 1/523 |
| | | | | 343/841 |
| 2014/0273835 A1* | 9/2014 | Ghovanloo | .......... | H04B 5/0037 |
| | | | | 455/41.1 |
| 2015/0207331 A1* | 7/2015 | Petersen | ................. | H02J 5/005 |
| | | | | 307/104 |

(Continued)

*Primary Examiner* — Thienvu V Tran
*Assistant Examiner* — Brian K Baxter
(74) *Attorney, Agent, or Firm* — Steven A. Wood, Jr.; Garrett Smith

(57) ABSTRACT

The present application provides a wireless power transfer system including a transmitter and at least one receiver, and also provides transmitters and receivers for such systems. The transmitter includes a driver coil and a transmitter coil magnetically coupled to each other and arranged along a plane, the driver coil and the transmitter coil being tuned to resonate at differing frequencies. The receiver includes a load coil and a receiver coil magnetically coupled to each other and arranged along a plane, the load coil and the receiver coil being tuned to resonate at differing frequencies. The driver coil and the transmitter coil of the transmitter, and the load and the transmitter coil of the receiver are strongly magnetically coupled to each other. The transmitter and the receiver are magnetically coupled to each to effectuate wireless power transfer from the transmitter to the receiver.

20 Claims, 11 Drawing Sheets

(56) References Cited

U.S. PATENT DOCUMENTS

| | | | |
|---|---|---|---|
| 2016/0028443 A1* | 1/2016 | Kim | H02J 7/025 |
| | | | 307/104 |
| 2017/0310162 A1* | 10/2017 | Matsumoto | H02J 50/05 |
| 2017/0353048 A1* | 12/2017 | Abidi | H02J 7/045 |
| 2018/0198322 A1* | 7/2018 | Mercier | H01F 38/14 |
| 2018/0269692 A1* | 9/2018 | Petersen | H02J 7/025 |
| 2019/0044394 A1* | 2/2019 | Hansen | H01F 38/14 |

* cited by examiner

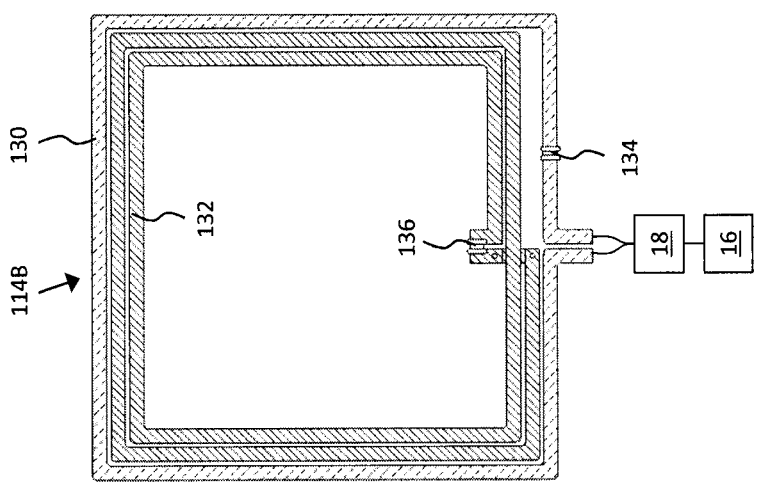
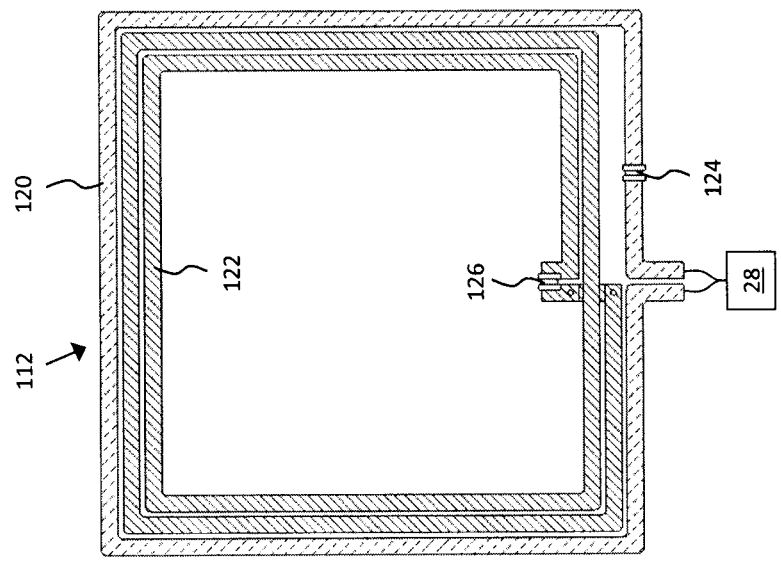
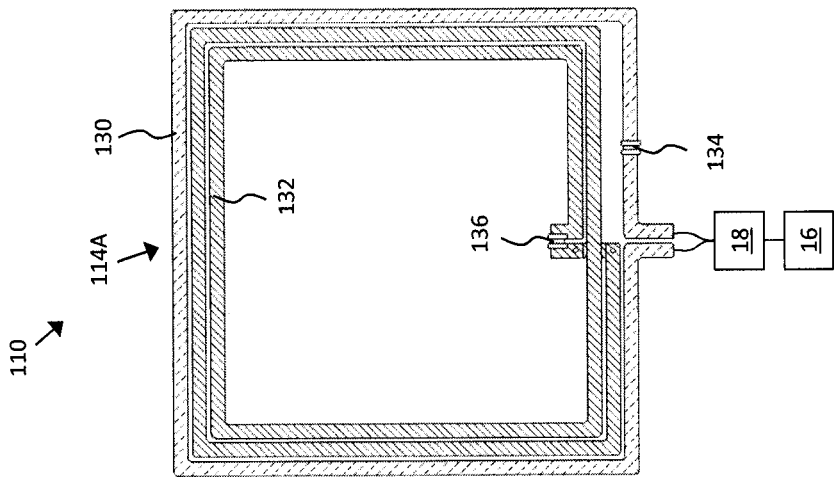
Figure 3

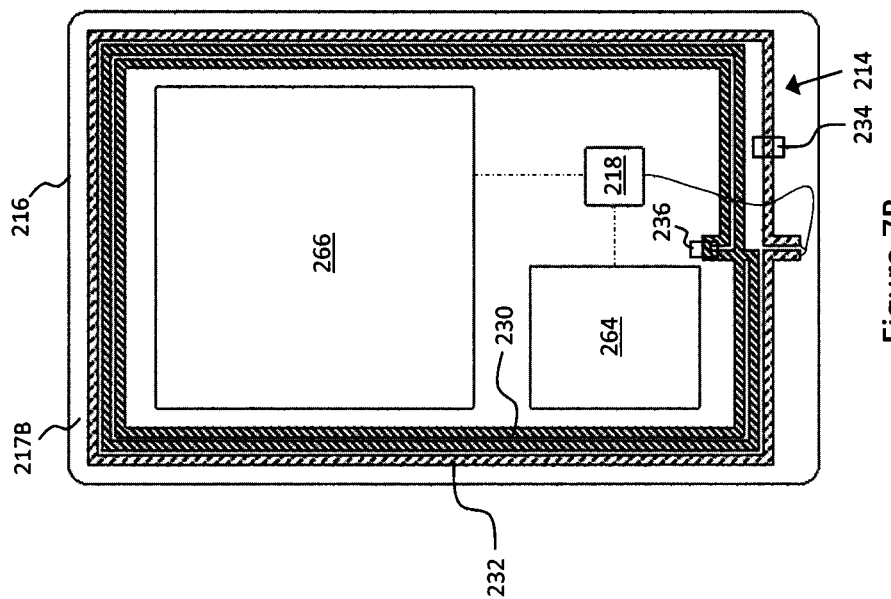
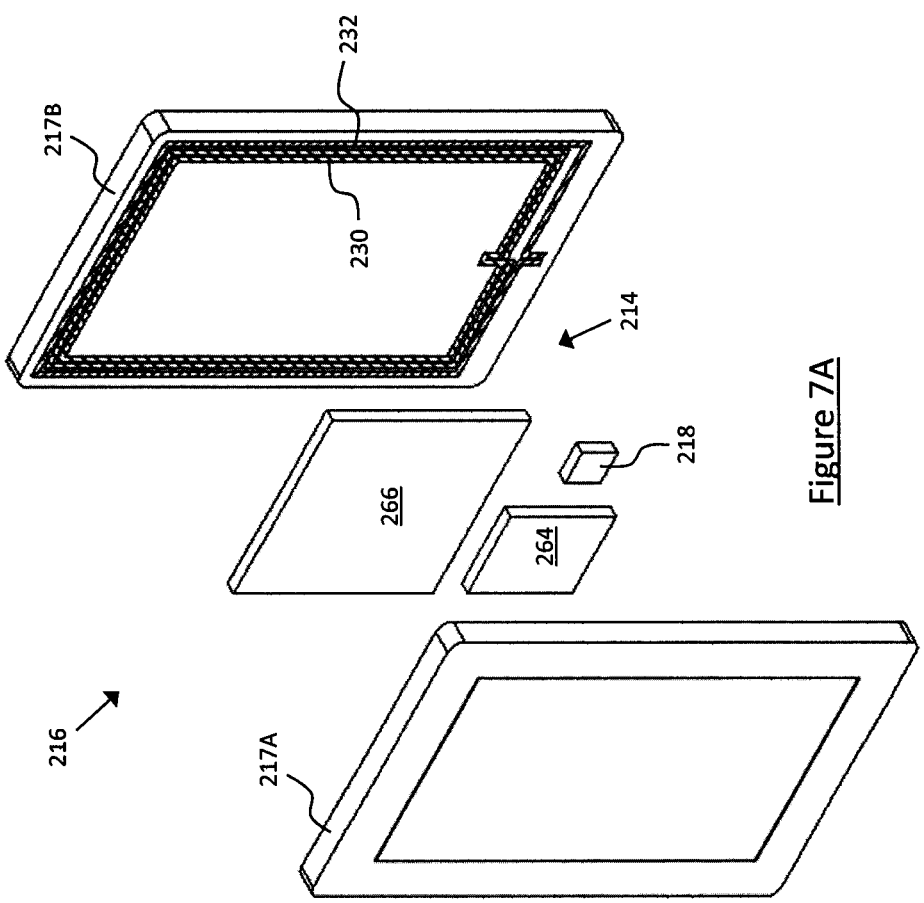

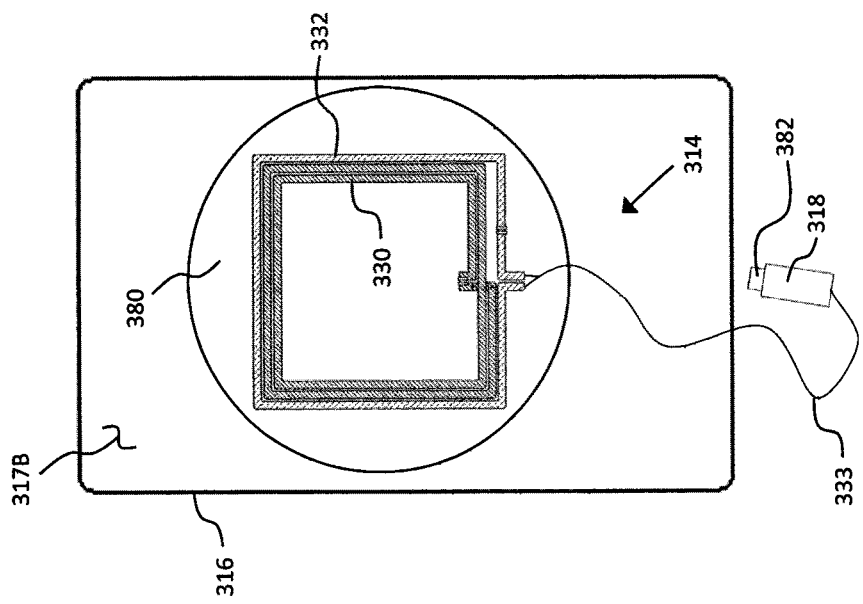
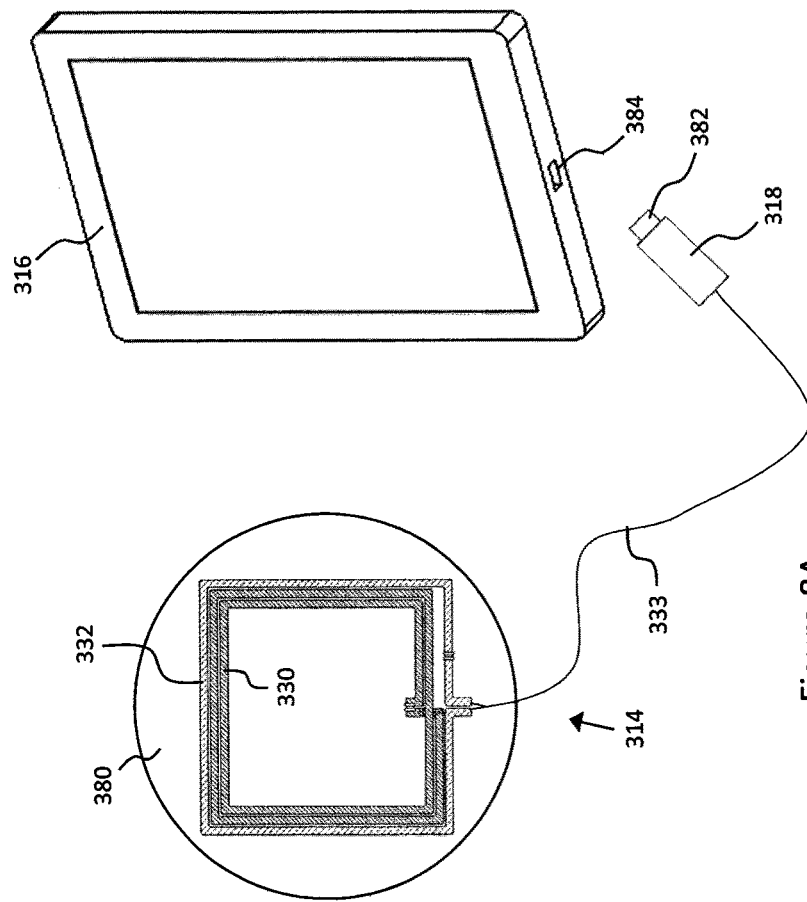

WIRELESS POWER TRANSFER SYSTEMS AND COMPONENTS THEREOF

CROSS-REFERENCE TO RELATED APPLICATION

This application claims priority benefit under 35 U.S.C. § 119(e) to U.S. Provisional Application No. 62/393,141, filed Sep. 12, 2016, and entitled Wireless Power Transfer Systems and Components Thereof, the entirety of which is incorporated herein by reference in its entirety.

FIELD OF THE INVENTION

The present disclosure is generally directed to wireless power transfer systems and components thereof. More particularly, the present disclosure is directed to magnetic resonance-based planarized wireless power transfer systems, and transmitters and receivers thereof.

BACKGROUND OF THE INVENTION

Wireless power transfer (WPT) of electrical energy was first introduced by Nicola Tesla at the beginning of the 20th century. However, the concept has received a great attention during the last decade. The popularization of portable consumer electronics, electronic medical implants, and electric vehicles has boosted the need and desirability of WPT techniques charging the batteries of, or otherwise powering, such devices.

Conventionally, near-field non-radiative magnetic induction link of tightly coupled coils has been used to implement wireless charging or powering of electronic devices. These systems unfortunately include a rapid degradation of the power transfer efficiency (PTE) with the increase in distance between the coils. To prevent or mitigate such degradation of PTE, some WPT systems utilize strongly coupled magnetic resonances. Strongly coupled magnetic resonances WPT systems have been demonstrated to provide a better transfer of energy and higher PTE as a relation to distance as compared conventional inductive link WPT systems.

A typical WPT system with strong magnetic resonances may include two coupled coils (a transmitter coil and a receiver coil) resonating at the frequency of the magnetic field excitation. Moreover, four-coil magnetic resonance-based WPT systems have been designed for improved impedance matching and an increased PTE. In such a configuration, a driver coil is typically included to the transmitter, and a load coil to the receiver, in close vicinity for matching purposes. In conventional four coils systems, weak coupling between driver/transmitter and receiver/load is generally used to allow them to resonate at the operation frequency, because two tightly coupled coils cannot resonate at the same frequency. Therefore, the coils in the receiver and the transmitter are significantly separated or spaced thereby increasing the size or envelope of the systems.

In some other WPT systems, 3D circular wire loops or spiral loops have been used for the transmitters and receivers. However, these loop-based designs are relatively bulky and are thereby unsuitable for miniaturized devices. Still further, some nonplanar WPT systems utilize tightly coupled resonators for the transmitter and/or the receiver, designed to have different resonance frequencies and spaced apart at considerable distances to overcome a phenomenon of splitting of the resonance frequency. Again, the relatively large spacing of the tightly coupled resonators in the transmitter and/or receiver make these systems unsuitable for miniaturized devices. Still further, some WPT systems utilize tightly coupled resonators for the transmitter and the receiver, and power transfer takes place between the closely spaced, strongly coupled transmitter and receiver. In such embodiments, the close spacing between the transmitter and the receiver limits the value or applications of such systems.

Accordingly, improved WPT systems are desirable. For example, WPT systems that include a planarized transmitter and/or receiver are desirable. As another example, WPT systems that transfer power to at least one receiver at opposing sides of a transmitter are also desirable. Still further, WPT systems that provide relatively high PTEs between a transmitter and one or more receivers spaced at relatively far distances are desirable.

SUMMARY OF THE INVENTION

In one aspect, the present disclosure provides for a wireless power transfer system including a transmitter and at least one receiver. The transmitter includes a driver coil and a transmitter coil magnetically coupled to each other and arranged along a plane, the driver coil and the transmitter coil being tuned to resonate at differing frequencies. The at least one receiver includes a load coil and a receiver coil magnetically coupled to each other and arranged along a plane, the load coil and the receiver coil being tuned to resonate at differing frequencies. The coupling coefficient of the driver and transmitter coils of the transmitter is greater than or equal to 0.1, and the coupling coefficient of the load and receiver coils of at least one receiver is greater than or equal to 0.1. The transmitter and the at least one receiver are magnetically coupled to each and tuned such that the coupling coefficient therebetween is less than 0.2 to effectuate wireless power transfer from the transmitter to the at least one receiver.

In some embodiments, the at least one receiver includes at least one first receiver and at least one second receiver. In some such embodiments, the at least one first receiver and the at least one second receiver are positioned on opposing sides of the transmitter. In some such embodiments, the at least one first receiver and the at least one second receiver are each spaced from the transmitter a corresponding distance up to about twice the largest diameter of the transmitter coil of the transmitter.

In some embodiments, the transmitter and the at least one receiver are magnetically coupled and tuned such that the coupling coefficient therebetween is within the range of 0.05 to 0.1. In some embodiments, at least one of the driver coil, the transmitter coil, the load coil or the receiver coil is formed of a multi-turn planar spiral coil. In some embodiments, at least one of the driver coil, the transmitter coil, the load coil or the receiver coil is formed of a single-turn planar coil. In some embodiments, the driver and transmitter coils of the transmitter are arranged concentrically, and the load and receiver coils of the at least one receiver are arranged concentrically.

In some embodiments, the driver coil and the transmitter coil each include at least one capacitor coupled thereto. In some such embodiments, the capacitance of the at least one capacitor of each of the driver coil and the transmitter coil is tunable. In some embodiments, the load coil and the receiver coil each include at least one capacitor coupled thereto. In some such embodiments, the capacitance of the at least one capacitor of each of the load coil and the receiver coil is tunable. In some other such embodiments, the resonant frequencies of at least one of the driver coil, the transmitter coil, the load coil and the receiver coil is tunable.

In some embodiments, the transmitter and the at least one receiver are configured to resonate at the substantially same frequency. In some embodiments, the transmitter and the at least one receiver are configured to resonate at different frequencies. In some embodiments, the driver coil, the transmitter coil, the load coil and the receiver coil are tuned to resonate at different frequencies. In some embodiments, the transmitter resonates at a different frequency than the frequencies at which the driver coil and the transmitter coil are tuned to resonate. In some embodiments, the at least one receiver resonates at a different frequency than the frequencies at which the load coil and the receiver coil are tuned to resonate.

In some embodiments, the system further includes an oscillating electric current applied to the driver coil of the transmitter. In some such embodiments, the oscillating electric current oscillates at an operation frequency, and wherein the system is configured to resonate at the operation frequency. In some embodiments, the system is configured to resonate at an operation frequency that differs from the frequencies at which the driver coil, the transmitter coil, the load coil and the receiver coil are tuned to resonate.

In some embodiments, the first and second receivers are configured to removably couple to a respective electronic device and include a connector to electrically couple to a battery of the electronic device via a connector of the respective electronic device to transfer power thereto via resonant inductive coupling of the first and second receivers and the transmitter. In some embodiments, the first and second receivers are fixed to a respective electronic device and are electrically coupled to a battery of the respective electronic device to transfer power thereto via resonant inductive coupling of the first and second receivers and the transmitter.

In another aspect, the present disclosure provides for a receiver for supplying electrical current to an electronic device via wireless power transfer from a transmitter. The receiver includes a load coil and a receiver coil arranged along a plane and configured to magnetically couple to each other with a coupling coefficient greater than or equal to 0.1, the load coil and the receiver coil being tuned to resonate at differing frequencies. The load coil and the receiver coil are configured to magnetically couple to a transmitter including a driver coil and a transmitter coil tuned to resonate at differing frequencies with a coupling coefficient less than 0.2 to effectuate wireless power transfer from the transmitter to the load coil.

In some embodiments, the driver coil and the transmitter coil of the transmitter are arranged along a plane and configured to magnetically coupled to each with a coupling coefficient greater than or equal to 0.1. In some embodiments, the load coil and the receiver coil are configured to magnetically couple to the transmitter including the driver coil and the transmitter coil with a coupling coefficient within the range of 0.05 to 0.1. In some embodiments, the load coil of the receiver is electrically coupled to a battery of the electronic device. In some embodiments, the load coil of the receiver is electrically coupled to a rectifier. In some embodiments, at least one of the load coil or the transmitter coil is formed of a multi-turn planar spiral coil. In some embodiments, at least one of the load coil or the transmitter coil is formed of a single-turn planar coil. In some embodiments, the load and receiver coils are arranged concentrically.

In some embodiments, the load coil and the receiver coil each include at least one capacitor coupled thereto. In some such embodiments, the capacitance of the at least one capacitor of each of the load coil and the receiver coil is tunable. In some embodiments, the resonant frequencies of at least one of the load coil or the receiver coil is tunable. In some embodiments, the transmitter and the combination of the load coil and the receiver coil are configured to resonate at the substantially same frequency. In some embodiments, the transmitter and the combination of the load coil and the receiver coil are configured to resonate at different frequencies. In some embodiments, the driver coil, the transmitter coil, the load coil and the receiver coil are tuned to resonate at different frequencies. In some embodiments, the combination of the load coil and the receiver coil resonates at a different frequency than the frequencies at which the load coil and the receiver coil are tuned to resonate.

In some embodiments, the receiver is configured to removably couple to the electronic device, and further includes a connector configured to electrically couple to a battery of the electronic device via a connector of the electronic device to transfer power thereto via resonant inductive coupling of the receiver and the transmitter. In some embodiments, the receiver is fixed to the electronic device and is electrically coupled to a battery of the electronic device to transfer power thereto via resonant inductive coupling of the receiver and the transmitter.

In another aspect, the present disclosure provides for a transmitter for resonantly magnetically inducing an electrical current through at least one receiver coupled to an electronic device to supply the electrical current to the device. The transmitter includes a driver coil and a transmitter coil arranged along a plane and configured to magnetically couple to each other with a coupling coefficient greater than or equal to 0.1, the driver coil and the transmitter coil being tuned to resonate at differing frequencies. The driver coil and the transmitter coil are configured to magnetically couple to at least one receiver including a load coil and a receiver coil tuned to resonate at differing frequencies with a coupling coefficient less than 0.2 to effectuate wireless power transfer from the transmitter to the load coil.

In some embodiments, the load coil and a receiver coil of the at least one receiver are arranged along a plane and configured to magnetically couple to each with a coupling coefficient greater than or equal to 0.1. In some embodiments, the load coil of the at least one receiver is electrically coupled to a battery of the electronic device. In some embodiments, the driver coil and the transmitter coil are configured to magnetically couple a plurality of receivers each including the load coil and the receiver coil tuned to resonate at differing frequencies with a coupling coefficient less than 0.2 to effectuate wireless power transfer from the transmitter to the load coils. In some embodiments, the driver coil and the transmitter coil are configured to magnetically couple to the least one receiver including the load coil and the receiver coil with a coupling coefficient within the range of 0.05 to 0.1.

In some embodiments, at least one of the driver coil or the transmitter coil is formed of a multi-turn planar spiral coil. In some embodiments, at least one of the driver coil or the transmitter coil is formed of a single-turn planar coil. In some embodiments, the driver and transmitter coils are arranged concentrically. In some embodiments, the driver coil and the transmitter coil each include at least one capacitor coupled thereto.

In some embodiments, the capacitance of the at least one capacitor of each of the driver coil and the transmitter coil is tunable. In some such embodiments, the resonant frequencies of at least one of the driver coil or the transmitter coil is tunable. In some embodiments, the combination of the driver coil and a transmitter coil and the at least one receiver are configured to resonate at the substantially same frequency. In some embodiments, the combination of the driver coil and a transmitter coil and the at least one receiver are configured to resonate at different frequencies. In some embodiments, the combination of the driver coil and a transmitter coil resonates at a different frequency than the frequencies at which the driver coil and the transmitter coil are tuned to resonate. In some embodiments, the transmitter further includes an oscillating electric current applied to the driver coil. In some such embodiments, the oscillating electric current oscillates at an operation frequency, and the combination of the driver coil, the transmitter coil, the load coil and the receiver coil is configured to resonate at the operation frequency.

These and other objects, features and advantages of this disclosure will become apparent from the following detailed description of the various aspects of the disclosure taken in conjunction with the accompanying drawings.

BRIEF DESCRIPTION OF THE DRAWINGS

FIG. 3 illustrates a transmitter and receiver design of a WPT system according to the present disclosure;

FIG. 7A illustrates an exploded view of an implementation of a receiver of a WPT system according to the present disclosure;

FIG. 7B illustrates a front cross-sectional view of the implementation of the receiver of FIG. 7A;

FIG. 8A illustrates a perspective view of an implementation of a receiver of a WPT system according to the present disclosure;

FIG. 8B illustrates a back view of the implementation of the receiver of FIG. 8A;

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of parameters are not exclusive of other parameters of the disclosed embodiments. Components, aspects, features, configurations, arrangements, uses and the like described, illustrated or otherwise disclosed herein with respect to any particular figure or embodiment may similarly be applied to any other figure or embodiment disclosed herein.

Figure 1:
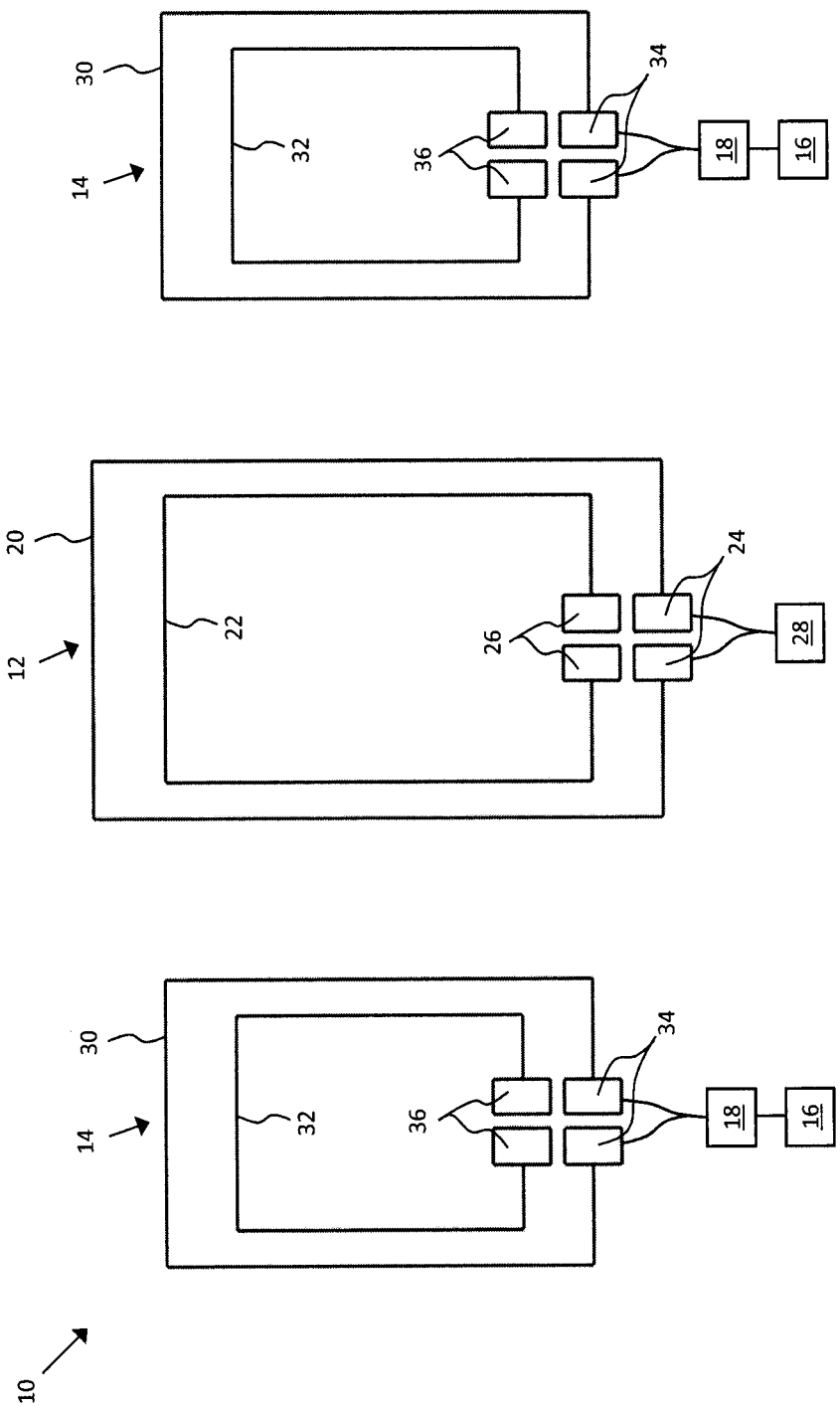
FIG. 1 illustrates a wireless power transfer (WPT) system according to the present disclosure.

FIG. 1 illustrates an exemplary wireless power transfer (WPT) system 10, and related wireless power transfer method, according to the present disclosure. As shown in FIG. 1, the WPT system 10 includes a transmitter 12 and at least one receiver 14 configured to effectuate wireless power transfer from the transmitter 12 to the at least one receiver 14, and thereby to a device 16 (such as to a battery of the device 16) electrically coupled to the at least one receiver 14. In some embodiments, the system 10 may include a plurality of receivers 14, such as at least two receivers 14 as shown in FIG. 1. The transmitter 12 and the at least one receiver 14 may be separate and distinct components or devices that interact wirelessly, as discussed further below. The system 10 may be configured to utilize strongly coupled magnetic resonances of each of the transmitter 12 and the at least one receiver 14, and a weak coupling between the transmitter 12 and the at least one receiver 14, to effectuate wireless power transfer from the transmitter 12 to the at least one receiver 14. In some embodiments, the system 10, as a whole, may be configured to resonate at an operation frequency such that the coils of each of the transmitter 12 and the at least one receiver 14 resonate due to magnetic induction between the coils of each of the transmitter 12 and the at least one receiver 14 and between the transmitter 12 and the at least one receiver 14 themselves. In some embodiments, the resonance frequency or operation frequency of the system 10, as a whole, may be within the range of about 12 MHz to about 15 MHz. In one such embodiment, for example, the resonance frequency or operation frequency of the system 10, as a whole, may be about 13.56 MHz.

The transmitter 12 and/or the at least one receiver 14 may include at least a pair of inductors. The resonance frequency of the transmitter 12, as a whole, and the resonance frequency of the at least one receiver 14, as a whole, may thereby be the frequency at which all the inductors thereof resonate together or as a unit when the inductors of the transmitter 12 and/or the at least one receiver 14 are magnetically coupled and the transmitter 12 and/or the at least one receiver 14 may are magnetically coupled. As shown in FIG. 1, the transmitter 12 may include a first inductor formed of an electrically conductive driver coil 20 and at least one capacitor 24 electrically coupled across the driver coil 20, and a second inductor formed of an electrically conductive transmitter coil 22 and at least one capacitor 26 electrically coupled across the transmitter coil 22. The inductor or driver coil 20 and the at least one capacitor 24 of the transmitter 12 are each configured to form a respective resonant circuit (also referred to as an LC circuit or resonator) for storing energy within its magnetic field oscillating at the circuit's resonance frequency. Similarly, the inductor or transmitter coil 22 and the at least one capacitor 26 of the transmitter 12 are configured to form a resonant circuit for storing energy oscillating at the circuit's resonance frequency. The resonant circuit/driver coil 20 and the resonant circuit/transmitter coil 22 may each be tuned to resonate at particular frequencies that are different from each other. The driver coil 20 and the transmitter coil 22 (as tuned) may thereby be asynchronous resonators. For example, in some embodiments the resonance frequencies of the driver coil 20 and the transmitter coil 22 may differ by at least 5% of the lower of the frequencies or by at least about 0.5 MHz. Further, the resonant frequencies of the driver coil 20 and the transmitter coil 22 (as tuned) may each be different than the resonance frequency of the system 10, as a whole (i.e., the operation frequency). Similarly, the resonant frequencies of the driver coil 20 and transmitter coil 22 (as tuned) may each be different than the resonance frequency of the transmitter 12, as a whole (i.e., the resonance frequency of the combination of the driver coil 20 and transmitter coil 22).

The resonance frequency of each of the driver coil 20 and the transmitter coil 22 may be tuned by the physical layout and parameters of the inductors/coils 20, 22, the capacitance of the at least one capacitor 24, 26 associated therewith, an additional tuning mechanism associated therewith, or a combination thereof, for example. The resonance frequency of the driver coil 20 and the transmitter coil 22 may thereby each be tuned to a variety of differing frequencies via changing or altering the physical layout and parameters of the conductors/coils 20, 22, the capacitance of the at least one capacitor 24, 26 associated therewith, an additional tuning mechanism associated therewith, or a combination thereof. In some embodiments, the at least one capacitor 24 associated with the driver coil 20 and/or the at least one capacitor 26 associated with the transmitter coil 22 may be a tunable capacitor configured such that the capacitance thereof may be changed or varied to thereby tune the resonance frequency of the associated driver coil 20 or transmitter coil 22. In some embodiments, the system 10 may include an additional tuning mechanism (not shown) configured to tune or alter the resonance frequency of the driver coil 20, and/or additional tuning mechanism (not shown) configured to tune or alter the resonance frequency of the transmitter coil 22. For example, the system 10 may include chip inductor configured to tune or alter the resonance frequency of the driver coil 20 and/or chip inductor configured to tune or alter the resonance frequency of the transmitter coil 22.

The physical layout and parameters of the driver coil 20 and/or the transmitter coil 22 may be fixed or may be configured to be changed or altered to tune the resonance frequency thereof. As shown in FIG. 1, the driver coil 20 and the transmitter coil 22 may each be formed of a single turn coil or loop of an electrically conductive material, such as a metal wire or layer. In some embodiments, the driver coil 20 and/or the transmitter coil 22 may be formed of a multi-turn coil or loop of conductive material, such as a spiral coil. In such embodiments, adjacent turns may be at least slightly spaced from each other. The at least one capacitor 24 associated with the driver coil 20 and/or the at least one capacitor 26 with the transmitter coil 22 may be connected across the free ends of the conductive material thereof. In some embodiments, the driver coil 20 and/or the transmitter coil 22 may be high Q coils.

As explained further below, each of the driver coil 20 and the transmitter coil 22 may be planar (i.e., planar single or planar multi-turn coils or loops). As shown in FIG. 1, the driver coil 20 and the transmitter coil 22 may be arranged on the same plane, and may be arranged concentrically. For example, the planar transmitter coil 22 may be provided or positioned within the inner-most turn or loop of the planar driver coil 20, as shown in FIG. 1. The driver coil 20 and the transmitter coil 22 may be in the form of any planar coil or loop shape, such as circular, elliptical, square, rectangular, hexagonal or polygonal as shown in FIG. 1. In some embodiments, the shape of the driver coil 20 and the transmitter coil 22 may be substantially the same shape. Adjacent portions of the driver coil 20 and the transmitter coil 22 may be spaced from each other. In some embodiments, the driver coil 20 and the transmitter coil 22 of the transmitter 12 may be provided on or coupled to a non-conductive substrate (e.g., a planar non-conductive substrate) (not shown), such as a dielectric substrate.

The driver coil 20 and the transmitter coil 22 of the transmitter 12 may be configured or arranged such that the coupling coefficient therebetween (also referred to as the coefficient of coupling, coupling factor and the letter "k") (i.e., the amount of the magnetic flux linkage between the driver coil 20 and the transmitter coil 22 as a fraction of the total possible flux linkage there between) may be greater than or equal to 0.1 during use of the system 10. For example, the driver coil 20 and the transmitter coil 22 of the transmitter 12 may be magnetically coupled or linked to each other (e.g., by a common magnetic flux) during use of the system 10. As shown in FIG. 1, the driver coil 20 may be coupled to a source 28 of an oscillating electric current, such as via or through the at least one capacitor 24. The oscillating electric current provided by the source 28 may oscillate at the operation frequency of the system 10. The oscillating electric current may thereby cause the driver coil 20 to generate and induce an oscillating magnetic field (e.g., an electric and magnetic field). The oscillating magnetic field generated by the driver coil 20 may be induced into the transmitter coil 22 such that the driver coil 20 and the transmitter coil 22 are strongly resonantly magnetically coupled (i.e., linked together by a common magnetic flux) with a coupling coefficient greater than or equal to 0.1. The oscillating magnetic field generated by the driver coil 20 is coupled to transmitter coil 22 and induces oscillating electric current within the transmitter coil 22. Thus the driver coil 20 and transmitter coil 22 together create a single EMF.

As shown in FIG. 1, the at least one receiver 14 may include a first inductor formed of an electrically conductive load coil 30 and at least one capacitor 34 electrically coupled across the load coil 30, and a second inductor formed of an electrically conductive receiver coil 32 and at least one capacitor 36 electrically coupled across the receiver coil 32. The inductor or load coil 30 and the at least one capacitor 34 of the at least one receiver 14 are each configured to form a respective resonant circuit (also referred to as an LC circuit or resonator) for storing energy within its magnetic field oscillating at the circuit's resonance frequency. Similarly, the inductor or receiver coil 32 and the at least one capacitor 36 of the at least one receiver 14 are configured to form a resonant circuit for storing energy oscillating at the circuit's resonance frequency. The resonant circuit/load coil 30 and the resonant circuit/receiver coil 32 may each be tuned to resonate at particular frequencies that are different from each other. The load coil 30 and the receiver coil 32 (as tuned) may thereby be asynchronous resonators. For example, in some embodiments the resonant frequencies of the load coil 30 and the receiver coil 32 may differ by at least 5% of the lower of the frequencies or by at least about 0.5 MHz. Further, the resonant frequencies of the load coil 30 and the receiver coil 32 (as tuned) may each be different than the resonance frequency of the system 10, as a whole (i.e., the operation frequency). Similarly, the resonant frequencies of the load coil 30 and receiver coil 32 (as tuned) may each be different than the resonance frequency of the at least one receiver 14, as a whole (i.e., the resonance frequency of the combination of the load coil 30 and receiver coil 32). Still further, the resonant frequencies of the load coil 30 and receiver coil 32 (as tuned) may each be different than the resonant frequencies of the driver coil 30 and the transmitter coil 34 (as tuned). Stated differently, the driver coil 20, transmitter coil 22, the load coil 30 and the receiver coil 32 may be tuned to resonate at different frequencies.

The resonance frequency of each of the load coil 30 and the receiver coil 32 may be tuned by the physical layout and parameters of the inductors/coils 30, 32, the capacitance of the at least one capacitor 34, 36 associated therewith, an additional tuning mechanism associated therewith, or a combination thereof, for example. The resonance frequency of the load coil 30 and the receiver coil 32 may thereby each be tuned to a variety of differing frequencies via changing or altering the physical layout and parameters of the conductors/coils 30, 32, the capacitance of the at least one capacitor 34, 36 associated therewith, an additional tuning mechanism associated therewith, or a combination thereof. In some embodiments, the at least one capacitor 34 associated with the load coil 30 and/or the at least one capacitor 36 associated with the receiver coil 32 may be a tunable capacitor configured such that the capacitance thereof may be changed or varied to thereby tune the resonance frequency of the associated load coil 30 or receiver coil 32. In some embodiments, the system 10 may include an additional tuning mechanism (not shown) configured to tune or alter the resonance frequency of the load coil 30, and/or additional tuning mechanism (not shown) configured to tune or alter the resonance frequency of the receiver coil 32. For example, the system 10 may include a chip inductor configured to tune or alter the resonance frequency of the load coil 30 and/or a chip inductor configured to tune or alter the resonance frequency of the receiver coil 32.

The physical layout and parameters of the load coil 30 and/or the receiver coil 32 may be fixed or may be configured to be changed or altered to tune the resonance frequency thereof. As shown in FIG. 1, the load coil 30 and the receiver coil 32 may each be formed of a single turn coil or loop of an electrically conductive material, such as a metal wire or layer. In some embodiments, the load coil 30 and/or the receiver coil 32 may be formed of a multi-turn coil or loop of conductive material. In such embodiments, adjacent turns may be at least slightly spaced from each other. The at least one capacitor 34 associated with the load coil 30 and/or the at least one capacitor 36 with the receiver coil 32 may be connected across the free ends of the conductive material thereof. In some embodiments, the load coil 30 and/or the receiver coil 32 may be high Q coils.

As explained further below, each of the load coil 30 and the receiver coil 32 of the at least one receiver 14 may be planar (i.e., planar single or planar multi-turn coils or loops). As shown in FIG. 1, the load coil 30 and the receiver coil 32 may be arranged on the same plane, and may be arranged concentrically. For example, the planar receiver coil 32 may be provided or positioned within the inner-most turn or loop of the planar load coil 30, as shown in FIG. 1. The load coil 30 and the receiver coil 32 may be in the form of any planar coil or loop shape, such as circular, elliptical, square, rectangular, hexagonal, octagonal or polygonal as shown in FIG. 1. In some embodiments, the shape of the load coil 30 and the receiver coil 32 may be substantially the same shape. Adjacent portions of the load coil 30 and the receiver coil 32 may be spaced from each other. In some embodiments, the load coil 30 and the receiver coil 32 of the at least one receiver 14 may be provided on or coupled to a non-conductive substrate (e.g., a planar non-conductive substrate) (not shown), such as a dielectric substrate.

In some embodiments, the transmitter 12 and the at least one receiver 14 may be configured to resonate at the substantially same frequency. For example, the load coil 30 and the receiver coil 32 of the at least one receiver 14 may be substantially the same shape, size and turns as the driver coil 20 and the transmitter coil 22, respectively, of the transmitter 12 (and otherwise configured the same). In some other embodiments, the transmitter 12 and the at least one receiver 14 may be configured to resonate at different frequencies. For example, the load coil 30 and the receiver coil 32 of the at least one receiver 14 may be different shapes, sizes and/or turns as the driver coil 20 and the transmitter coil 22, respectively, of the transmitter 12 (or otherwise configured differently).

The load coil 30 and the receiver coil 32 of the at least one receiver 14 may be configured or arranged such that the coupling coefficient therebetween (i.e., the amount of the magnetic flux linkage between the load coil 30 and the receiver coil 32 as a fraction of the total possible flux linkage therebetween) may be greater than or equal to 0.1 during use of the system 10. For example, the load coil 30 and the receiver coil 32 of the at least one receiver 14 may be magnetically coupled or linked to each other (e.g., by a common magnetic flux) during use of the system 10. As described above, the driver coil 20 and the transmitter coil 22 of the transmitter 12 may generate an oscillating magnetic field oscillating at the operation frequency of the system 10 via the source 28. The transmitter 12 may be configured such that the load coil 30 and the receiver coil 32 are positioned within the oscillating magnetic field of the transmitter 12, and thereby the load coil 30 and the receiver coil 32 coupled to the oscillating magnetic field. In this way, the oscillating magnetic field generated by the driver coil 20 and the transmitter coil 22 is induced into the load coil 30 and the receiver coil 32 such that the load coil 30 and the receiver coil 32 of the at least one receiver 14 are resonantly magnetically coupled to the driver coil 20 and the transmitter coil 22 of the transmitter 12 with a coupling coefficient less than or equal to 0.2. Stated differently, the oscillating magnetic field generated by the driver coil 20 and the transmitter coil 22 may be induced into the load coil 30 and the receiver coil 32 such that the at least one receiver 14 is resonantly magnetically coupled to the transmitter 12 with a coupling coefficient less than or equal to 0.2. The oscillating magnetic field generated by the driver coil 20 and the transmitter coil 22 may be induced into the load coil 30 and the receiver coil 32 to cause the load coil 30 and the receiver coil 32 of the at least one receiver to be coupled to the corresponding oscillating magnetic field and generate an EMF. In some embodiments, the transmitter and the at least one receiver are magnetically coupled to each and tuned such that the coupling coefficient therebetween is less than or equal to 0.2. In some embodiments, the transmitter and the at least one receiver are magnetically coupled to each and tuned such that the coupling coefficient therebetween is less than or equal to 0.1. In some embodiments, the transmitter and the at least one receiver are magnetically coupled to each and tuned such that the coupling coefficient therebetween is within the range of about 0.05 to about 0.1.

The at least one receiver 14 may be configured such that the load coil 30 and the receiver coil 32 are strongly resonantly magnetically coupled with a coupling coefficient greater than or equal to 0.1. Stated differently, the oscillating magnetic field generated by the driver coil 20 and the transmitter coil 22 may be induced into the load coil 30 and the receiver coil 32 such that the load coil 30 and the receiver coil 32 of the at least one receiver 14 are strongly resonantly magnetically coupled to each other with a coupling coefficient greater than or equal to 0.1. The oscillating magnetic field associated with the load coil 30 (and the receiver coil 32) will cause the load coil 30 and the receiver coil 32 to resonate, as a whole, at the resonance frequency of the system 10, and thereby convert the oscillating magnetic field into an oscillating electric current within the load coil 30.

The load coil 30 of the at least one receiver 14 may transfer the oscillating electric current flowing therethrough (as a result of the oscillating magnetic field oscillating at the resonance frequency of the system 10 associated therewith) to a device 16, as shown in FIG. 1. In some embodiments, the at least one receiver 14 may be configured to condition the oscillating electric current flowing through the load coil 30 before feeding the current to the device 16. For example, as shown in FIG. 1 the at least one receiver 14 may include a converter or rectifier 18 that changes the oscillating (i.e., alternating) electric current (e.g., AC current) to a direct electric current that flows in only one direction (e.g., DC current) to the device 16. As explained further below, the receiver 14 may be configured to direct or pass the direct electric current to a battery of the device 16 for storage thereof, for example.

Figure 2:
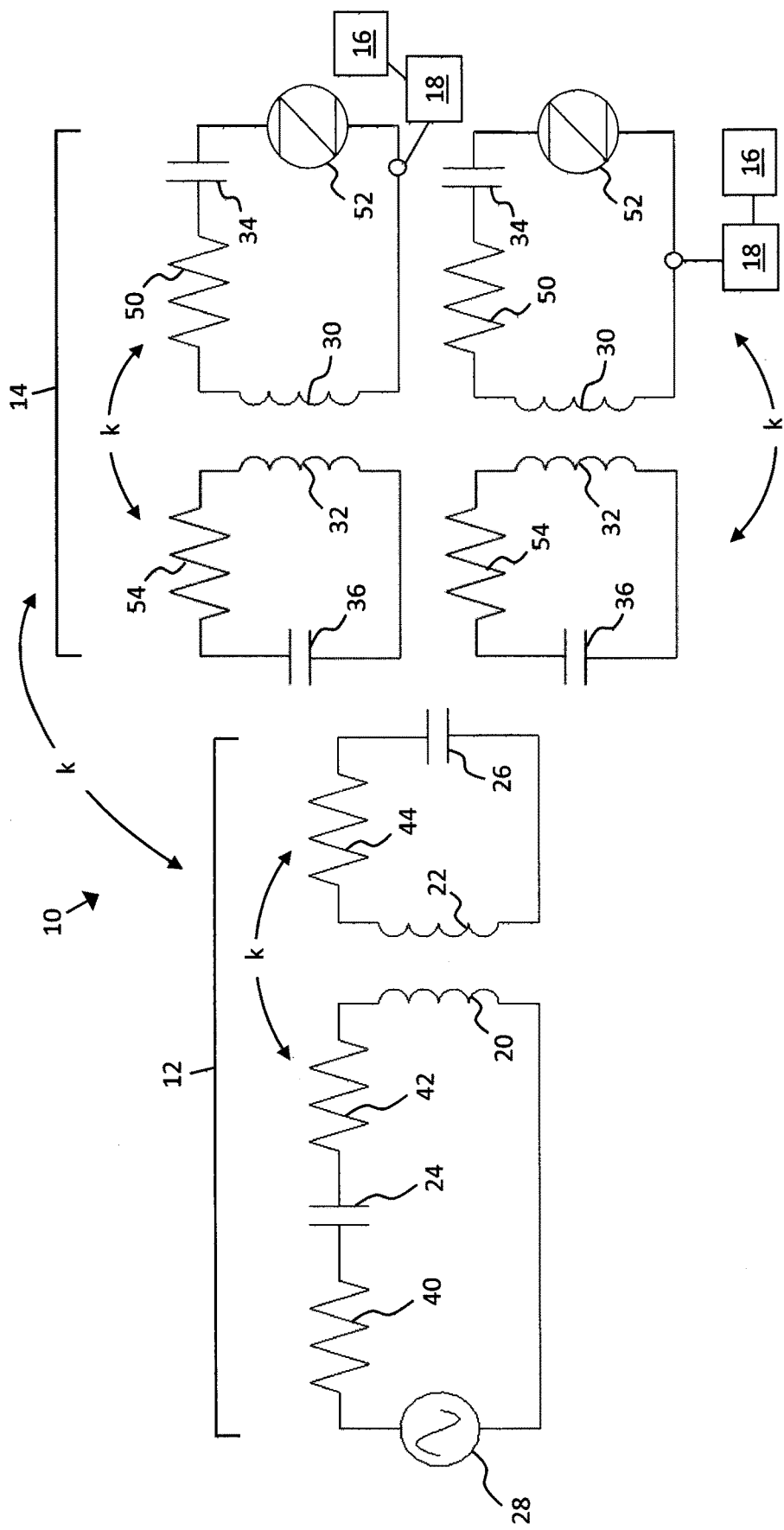
FIG. 2 illustrates an electrical circuit diagram of the WPT system of FIG. 1.

FIG. 2 illustrates a simplified electrical circuit diagram of the system 10. As shown in FIG. 2, the driver resonant circuit including the driver coil 20 of the transmitter 12 may include at least one first resistor 40, which represents the output resistance of the source 28, coupled between the input oscillating or alternating current 28 and the at least one capacitor 24, and at least one second resistor 42 coupled between the at least one capacitor 24 and the driver coil or inductor 20. The transmitter resonant circuit including the transmitter coil 22 of the transmitter 12 may include at least one third resistor 44 coupled between the transmitter coil or inductor 22 and the at least one capacitor 26, as shown in FIG. 2. As also shown in FIG. 2 and described above, when the input oscillating or alternating current 28 is applied to the driver coil 20 of the transmitter 12, the driver coil 20 and the transmitter coil 22 are resonantly magnetically coupled and include a mutual inductance therebetween. As also discussed above, the transmitter 12 may be configured such that the driver coil 20 and the transmitter coil 22 are strongly magnetically coupled with a coupling coefficient greater than or equal to 0.1.

As shown in FIG. 2, the load resonant circuit including the load coil 30 of the at least one receiver 14, such as at least a pair of receivers 14 as illustrated, may include at least one fourth resistor 50 coupled in series with the load coil or inductor 30 and the at least one capacitor 34. At least one load impedance 52, which represents the rectifier and the device to be charged, may be coupled in series to the load coil 30, the at least one capacitor 34 and the fourth resistor 50. The receiver resonant circuit including the receiver coil 32 of the at least one receiver 14 may include at least one fifth resistor 54 coupled between the at least one capacitor 36 and the receiver coil or inductor 32, as shown in FIG. 2. As also shown in FIG. 2 and described above, when the input oscillating or alternating current 28 is applied to the driver coil 20 of the transmitter 12, the oscillating magnetic field generated thereby is induced into the load coil 30 and the receiver coil 32 such that the load coil 30 and the receiver coil 32 are resonantly magnetically coupled and include a mutual inductance therebetween. As also discussed above, the at least one receiver 14 may be configured such that the load coil 30 and the receiver coil 32 are strongly magnetically coupled with a coupling coefficient greater than or equal to 0.1.

FIG. 2 further illustrates that the transmitter 12 and the at least one receiver 14, each as a whole, are resonantly magnetically coupled to each other via the oscillating magnetic fields when the input oscillating or alternating current 28 is applied to the driver coil 20 of the transmitter 12 at the resonance frequency of the system 10. As also discussed above, the transmitter 12 such that the at least one receiver 14, as a whole, are resonantly magnetically coupled to each other with a coupling coefficient less than or equal to 0.2. Although not depicted in FIG. 2, it is noted that during operation of the system 10, mutual inductance between each of the inductors or coils of the transmitter 12 and each of the inductors or coils of the at least one receiver 14 is created.

Figure 4:
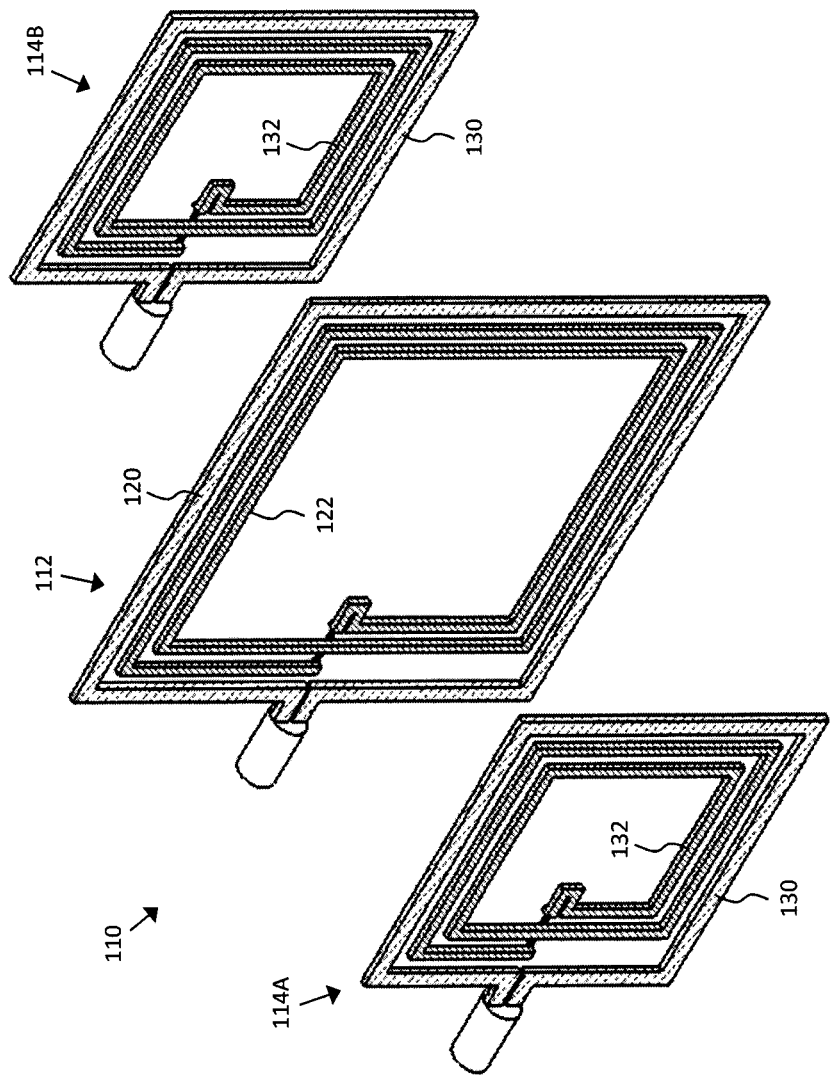
FIG. 4 illustrates a WPT system according to the present disclosure utilizing the transmitter and receiver design of FIG. 3.
Figure 5:
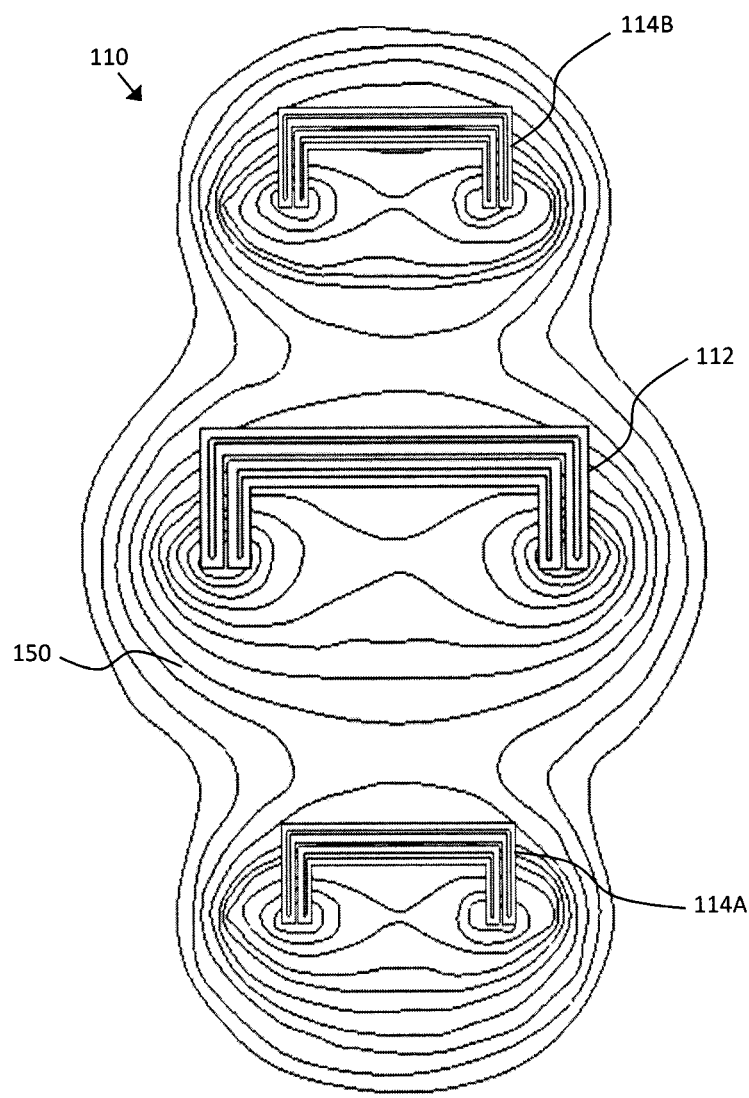
FIG. 5 illustrates a magnetic field distribution of the WPT system of FIG. 4.

Another WPT system 110 according to the present disclosure is shown in FIGS. 3-5. The WPT system 110 of FIGS. 3-5 is substantially similar to the WPT system 10 of FIGS. 1 and 2 described above, and therefore like reference numerals preceded with "1" are used to indicate like aspects, processes or functions, and the description above directed to aspects, processes or functions thereof (and the alternative embodiments thereof) equally applies to the WPT system 110. As shown in FIGS. 3 and 4, the WPT system 110 includes a planar transmitter 112 and at least one first planar receiver 114A and at least one second planar receiver 114B. The transmitter 112 includes a single turn driver coil 120 and a two-turn transmitter coil 122, as shown in FIGS. 3 and 4. As shown in FIG. 4, both the driver coil 120 and the transmitter coil 122 are substantially planar and on the same plane (e.g., concentric) such that the transmitter 112, as a whole, is planar. Similar to the transmitter 112, each of the at least one first receiver 114A and the at least one second receiver 114B include a single turn load coil 130 and a two-turn receiver coil 132, as shown in FIGS. 3 and 4. As shown in FIG. 4, both the load coil 130 and the receiver coil 132 are substantially planar and on the same plane (e.g., concentric) such that each of the at least one first receiver 114A and the at least one second receiver 114B, as a whole, are planar.

As shown in FIGS. 4 and 5, in use the WPT system 110 may be configured such that the transmitter 112, the at least one first receiver 114A and the at least one second receiver 114B are arranged substantially parallel to each other, with the at least one first receiver 114A and the at least one second receiver 114B aligned with the transmitter 112 and positioned on opposing sides of the transmitter 112. Such an arrangement may include a high power transfer efficiency from the transmitter 112 to the at least one first receiver 114A and the at least one second receiver 114B (and ultimately to the devices 116 coupled thereto) as compared to a non-planar and/or non-aligned arrangement.

The distance between the at least one first receiver 114A and the at least one second receiver 114B to the transmitter 112 may vary. For example, the transmitter 112 may be fixed at a particular position, and the at least one first receiver 114A and/or the at least one second receiver 114B may be movable with respect to the transmitter 112, such as being coupled to a respective portable or movable device 116. Although the distance between the at least one first receiver 114A and the at least one second receiver 114B to the transmitter 112 may vary, the system 110 may be configured or arranged such that they are resonantly magnetically coupled with a coupling coefficient less than 0.2, as discussed above. For example, in some embodiments the at least one first receiver 114A and/or the at least one second receiver 114B may be spaced from the transmitter 112 a distance of up to about twice the largest diameter of the transmitter coil 122 of the transmitter 112 to effectuate power transfer therebetween with an acceptable PTE. In such embodiments, if the largest diameter of the transmitter coil 122 of the transmitter 112 is about 10 cm, the at least one first receiver 114A and/or the at least one second receiver 114B may be spaced from the transmitter 112 about 20 cm or less and effectuate power transfer therebetween at reasonable PTEs. In such arrangements, the system 110 may effectuate power transfer between the transmitter 112 and the at least one first receiver 114A and/or the at least one second receiver 114B with a PTE of at least about 50%. As the distance between the at least one first receiver 114A and/or the at least one second receiver 114B from the transmitter 112 increases, the coupling therebetween may weaken (and thereby the coupling coefficient may decrease) and the PTE may decrease. The system 110 may be configured such that the spacing between the transmitter 112 and the at least one first receiver 114A and/or the at least one second receiver 114B may be within the range of about ½ the largest diameter of the transmitter coil 122 to 1.5 times the largest diameter of the transmitter coil 122, the coupling coefficient therebetween may be within the range of 0.05 to 0.1, and the PTE of the power transfer therebetween may be at least about 65%. For example, the exemplary embodiment of the system 110 shown in FIGS. 3-5 may be configured such that the system 110 includes at least about 65% PTE when the at least one first receiver 114A and/or the at least one second receiver 114B is/are spaced from the transmitter 112 a distance of about 1.5 times the largest diameter of the transmitter coil 122, at least about 85% PTE when the they are spaced a distance of about the largest diameter of the transmitter coil 122, and at least about 93% PTE when the they are spaced about ½ the largest diameter of the transmitter coil 122.

The distance between the at least one first receiver 114A and the at least one second diameter of receiver 114B from the transmitter 112 may affect the power transfer efficiency from the transmitter 112 to the at least one first receiver 114A and the at least one second receiver 114B. For example, as shown in FIG. 5 a portion of the oscillating magnetic field or magnetic flux 150 generated by the transmitter 112 may be induced into the at least one first receiver 114A and the at least one second receiver 114B at a particular distance from the transmitter 112. If the at least one first receiver 114A and the at least one second receiver 114B are moved further from the transmitter from such a distance, less of the oscillating magnetic field or magnetic flux 150 generated by the transmitter 112 may be induced into the at least one first receiver 114A and the at least one second receiver 114B, and thereby less current supplied to the devices 116 associated therewith.

Further, the resonance frequency of the system 110, as a whole, may be affected by, or at least partially dependent upon, the relative position or distance between the at least one first receiver 114A and the at least one second receiver 114B from the transmitter 112 (assuming the same orientation). As the frequency of the oscillating electric current 128 supplied to the driver coil 120 of the transmitter 112 may remain constant, the resonance frequency of the system 110 may not match the frequency of the supplied oscillating electric current 128 at a particular arrangement or distance between the transmitter 112 and at least one of the at least one first receiver 114A and the at least one second receiver 114B. As noted above, however, the at least one first receiver 114A, the at least one second receiver 114B and/or the transmitter 112 may be configured such that the resonant frequencies thereof are tunable. For example, the at least one capacitor 124 of the driver coil 120 and/or the at least one capacitor 126 of the transmitter coil 122 of the transmitter 112 may be varied to tune the resonance frequency of the transmitter 112, as a whole. Similarly, the at least one capacitor 134 of the load coil 130 and/or the at least one capacitor 136 of the receiver coil 122 of each of the at least one first receiver 114A and the at least one second receiver 114B may be varied to tune the resonant frequencies thereof, as a whole. In some embodiments, the system 110 may be configured such that the resonance frequency of the system 110, as whole, is automatically tuned to match the frequency of the oscillating electric current 128 supplied to the driver coil 120 of the transmitter 112 (which may remain substantially constant) to ensure a relatively high power transfer efficiency is maintained. For example, the system 110 may be configured such that the distance between the at least one first receiver 114A and the at least one second receiver 114B from the transmitter 112 is detected or determined, and the resonant frequencies of at least one of the coils or inductors of at least one of the at least one first receiver 114A, the at least one second receiver 114B and the transmitter 112 is tuned (e.g., varying the capacitance of the respective capacitor thereof), based on the respective distances, such that the resonance frequency of the system 110, as a whole, substantially matches the frequency of the oscillating electric current 128 supplied to the transmitter 112. In this way, for example, the system 110 may be configured to maintain a relatively high power transfer efficiency at varying distances between the transmitter 112 and the at least one first receiver 114A, the at least one second receiver 114B.

Figure 6A:
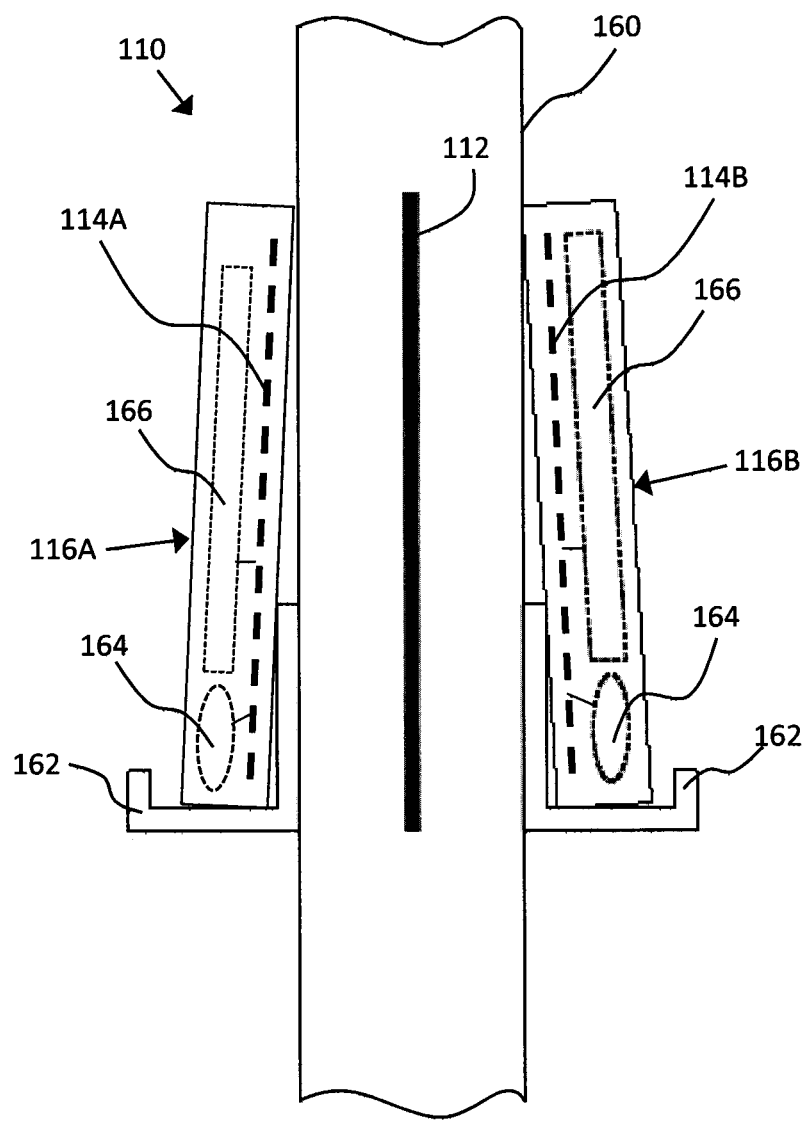
FIG. 6A illustrates a side view of an implementation of a WPT system according to the present disclosure.
Figure 6B:
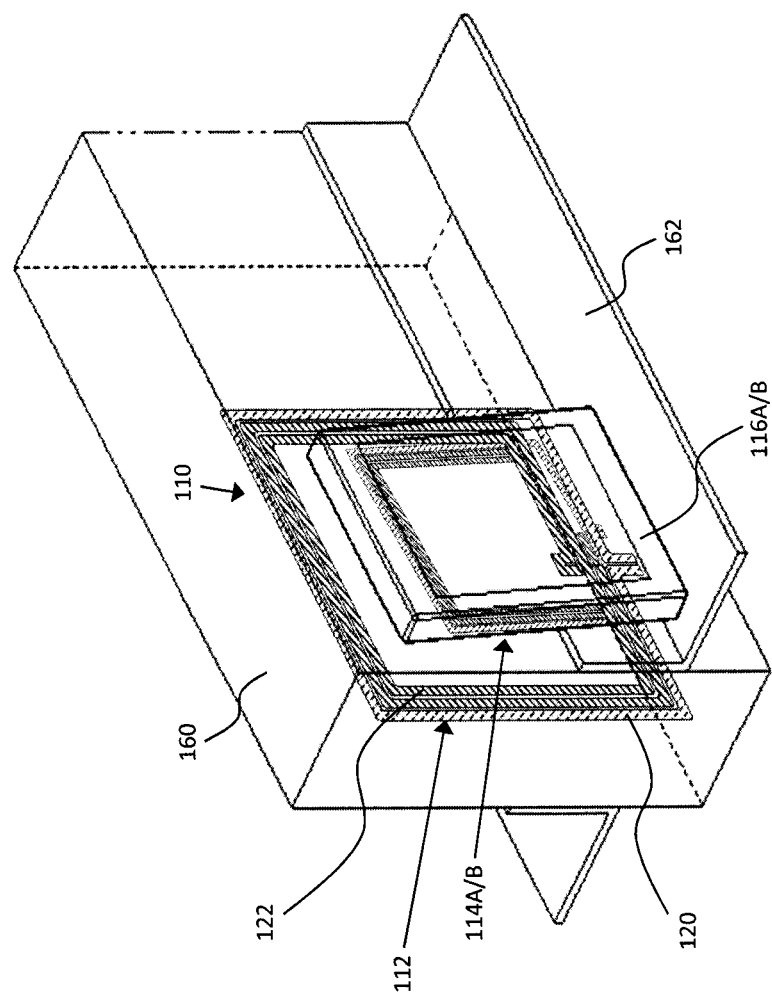
FIG. 6B illustrates a perspective view of the implementation of the WPT system of FIG. 6A.

FIGS. 6A and 6B illustrate an implementation of the WPT system 110 according to the present disclosure (WPT system 10 may also be implemented in such a manner). In some embodiments, the transmitter 112 may be coupled to a structure 160, such as a substantially fixed structure. For example, as shown in FIGS. 6A and 6B the transmitter 112 may be coupled to or within a fixed wall member 160. As also shown in FIGS. 6A and 6B, the at least one first receiver 114A may be coupled to a respective electronic device 116A and the at least one second receiver 114B may be coupled to a respective device 116B. The devices 116A, 116B may be portable or movable with respect to the transmitter 112 and the structure 160 and include a battery 164 for powering thereof, such as mobile electronic devices, as shown in FIG. 6A. For example, an electronic device 116A, 116B associated with the at least one first receiver 114A or the at least one second receiver 114B may be a smartphone, tablet computer, laptop computer, portable gaming system, camera, medical device or any other mobile or portable electronic device incorporating a battery 164 for powering thereof.

The at least one first receiver 114A or the at least one second receiver 114B may fixedly or removably coupled to a respective device 116A, 116B and configured to provide a recharging power to a battery 164 thereof. For example, in some embodiments the receiver 114A, 114B may be removably coupled to a respective device 116A, 116B (such as to the exterior thereof) with the load coil 130 selectively electrically coupled to the battery 164 thereof (e.g., via the converter or rectifier 118) for supplying the electrical current flowing through the load coil 130 to the battery 164. In some other embodiments, the receiver 114A, 114B may be fixed within the interior of a respective device 116A, 116B with the load coil 130 electrically coupled to the battery 164 thereof (e.g., via the converter or rectifier 118) for supplying the electrical current flowing through the load coil 130 to the battery 164, as shown in FIGS. 6A and 6B. The load coil 130 of the receiver 114A, 114B may be directly or indirectly electrically coupled to the battery 164 of the respective device 116A, 116B via the converter or rectifier 18. For example, as shown in FIG. 6A the load coil 130 of the receiver 114A, 114B may be directly electrically coupled (removably/selectively coupled or fixedly coupled) to the battery 164 of the respective device 116A, 116B via the converter or rectifier 118. Alternatively (or in addition thereto), as shown in FIG. 6A the load coil 130 of the receiver 114A, 114B may be indirectly electrically coupled (removably/selectively coupled or fixedly coupled) to the battery 164 of the respective device 116A, 116B via the converter or rectifier 118 being directly electrically coupled to a mechanism 166 that is electrically coupled (indirectly or directly electrically coupled) to the battery 164, such as a circuit board of the device 116A, 116B. In some such embodiments, the converter or rectifier 118 may be part of or coupled to the mechanism 166, such as a circuit board.

As shown in FIGS. 6A and 6B, the system 110 may be utilized by positioning the at least one first receiver 114A and/or the at least one second receiver 114B on a side of the transmitter 112 and the structure 160 and spaced from the transmitter 112. For example, in some embodiments the system 110 may include positioning members 162 that may hold or otherwise position a device 116A, 116B with respect to the transmitter 112 and the structure 160, as shown in FIGS. 6A and 6B. In some embodiments, the positioning members 162 may substantially align the respective device 116A, 116B (and thereby the receiver 114A, 114B coupled thereto) with respect to the transmitter 112, and orient the respective device 116A, 116B (and thereby the receiver 114A, 114B coupled thereto) substantially parallel to the transmitter 112. The system 110 may generate the resonant magnetic inductance, as described above, to generate the electrical current through the load coil 130 of the associated the receiver(s) 114A, 114B and, ultimately, to the battery 165 thereof to supply a recharging power thereto.

The receivers of the WPT systems of the present disclosure may be implemented in any number of ways. For example, FIGS. 7A and 7B illustrate an exemplary implementation of a receiver 214 of a WPT system according to the present disclosure. The receiver 214 is substantially similar to the receiver 14 of FIGS. 1 and 2 and the receivers 114A and 114B of FIGS. 3-6B described above, and therefore like reference numerals preceded with "2" are used to indicate like aspects, processes or functions, and the description above directed to aspects, processes or functions thereof (and the alternative embodiments thereof) equally applies to the receiver 214. As shown in FIGS. 7A and 7B, a receiver 214 may be implemented within a mobile or portable electronic device 216. For example, as shown in FIGS. 7A and 7B the concentric planar load coil 230 and planar receiver coil 232 may be provided between a front casing or cover 217A and a back cover or casing 217B of the device 216. In some embodiments, the receiver 214 (e.g., the concentric planar load coil 230 and planar receiver coil 232) may be provided about the periphery of the device 216 within the interior of the device 216, such as proximate to a back cover or casing 217B thereof. As discussed above, the converter or rectifier 218 of the receiver 214 may be directly electrically coupled to the battery 214 of the device 216 or indirectly electrically coupled to the battery 214 via a mechanism 266, such as a circuit board, that is in electrical connection (directly or indirectly) with the battery 214.

FIGS. 8A and 8B illustrate another exemplary implementation of a receiver 314 of a WPT system according to the present disclosure. The receiver 314 is substantially similar to the receiver 14 of FIGS. 1 and 2, the receivers 114A and 114B of FIGS. 3-6B and the receivers 214A and 214B of FIGS. 7A and 7B described above, and therefore like reference numerals preceded with "3" are used to indicate like aspects, processes or functions, and the description above directed to aspects, processes or functions thereof (and the alternative embodiments thereof) equally applies to the receiver 314. As shown in FIGS. 8A and 8B, the receiver 314 may be implemented with an attachment member 380 that is configured to couple at least the load coil 330 and the receiver coil 332 (and potentially the at least one capacitors 334, 336 thereof, for example) to a device 316. For example, the attachment member 380 may include a sheet-like member coupled to at least the load coil 330 and the receiver coil 332 of the receiver 314. The sheet-like member of the attachment member 380 may include a material or substance that adheres the planar member, and thereby the receiver 314, to the device 314, such as to an exterior surface 317B of the device 316 as shown in FIG. 8B. In some such embodiments, the attachment member 380 may be a sticker or patch like mechanism that couples the receiver 314 attached thereto to the device 316. In some embodiments, the sheet-like member of the attachment member 380 may be substantially planar, and/or the portion of the device 316 that the attachment member 380 adheres to may be substantially planar to ensure the planar configuration of the load coil 330 and the receiver coil 332.

As also shown in FIGS. 8A and 8B, in some embodiments the receiver 314 may also include an electrical cord or cable 333 including conductor(s) extending from the load coil 320 to the converter or rectifier 318. In some such embodiments, the electrical cord 333 may be configured to adhere to the device 316, such as to an exterior surface of the device 316 extending from the sheet-like member of the attachment member 380 to proximate to an electrical connector or plug 384 of the device 316. In some embodiments, the receiver 314 may include an electrical connector or plug 382 electrically coupled to the converter or rectifier 318 and configured to mate with the electrically connector or plug 384 of the device 316. The electrical connector or plug 384 of the device 316 may be electrically coupled to the battery 364 (not shown) of the device 316, and may be specifically configured for charging of the battery 364. When the connector or plug 384 of the device 316 and the electrical connector or plug 382 of the receiver 314 are mated an electrical connection between the load coil 320 and the battery 364 may be established for the flow current from the load coil 320 to the battery 364, as described above.

Figure 9:
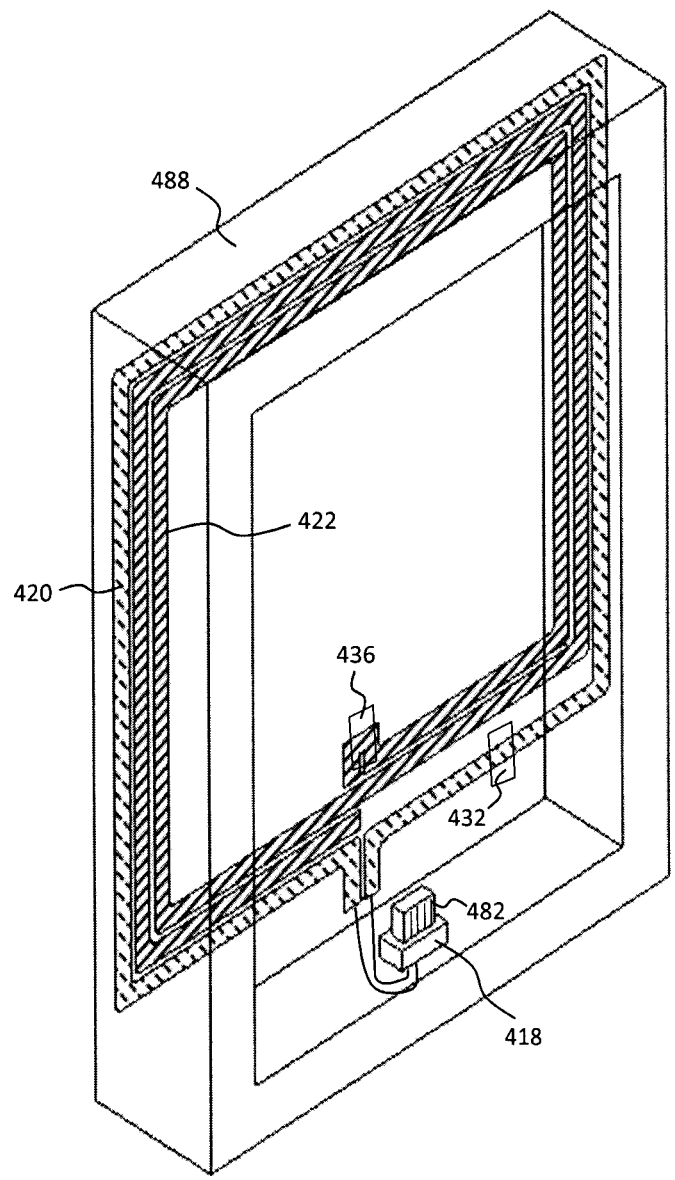
FIG. 9 illustrates a perspective view of an implementation of a receiver of a WPT system according to the present disclosure.

FIG. 9 illustrates another exemplary implementation of a receiver 414 of a WPT system according to the present disclosure. The receiver 414 is substantially similar to the receiver 14 of FIGS. 1 and 2, the receivers 114A and 114B of FIGS. 3-6B, the receivers 214A and 214B of FIGS. 7A and 7B and the receiver 314 of FIGS. 8A and 8B described above, and therefore like reference numerals preceded with "4" are used to indicate like aspects, processes or functions, and the description above directed to aspects, processes or functions thereof (and the alternative embodiments thereof) equally applies to the receiver 414. As shown in FIG. 9, the receiver 414 may be implemented with cover or case 488 configured to mate with an electronic device (not shown). For example, the cover or case 488 may be configured to mate with a smartphone or tablet computer. The cover or case 488 may be configured to removably couple to the electronic device, and may substantially surround a periphery of a portion of the electronic device, for example. The cover or case 488 may provide protection to the electronic device, may be decorative, and/or may provide a mechanism for supporting the electronic device is a particular orientation, for example.

As shown in FIG. 9, at least the load coil 420, the at least one capacitor 432 associated with the load coil 420, the receiver coil 422 and the at least one capacitor 434 associated with the receiver coil 422 may be coupled to or embedded within the cover or case 488. As also shown in FIG. 9, the converter or rectifier 418 and an electrical connector or plug 482 may also be provided by or coupled to the cover or case 488. As noted above, the electrical connector or plug 482 may be configured to mate with a connector or plug of an electronic device (not shown) such that an electrical connection between the load coil 420 and the battery of the device (not shown) is to be established for the flow current from the load coil 420 to the battery. The cover or case 488 may thereby be configured such that the electrical connector or plug 482 may be mated with the corresponding electrical connector or plug of a device when the cover or case 488 is coupled to the device.

Figure 10:
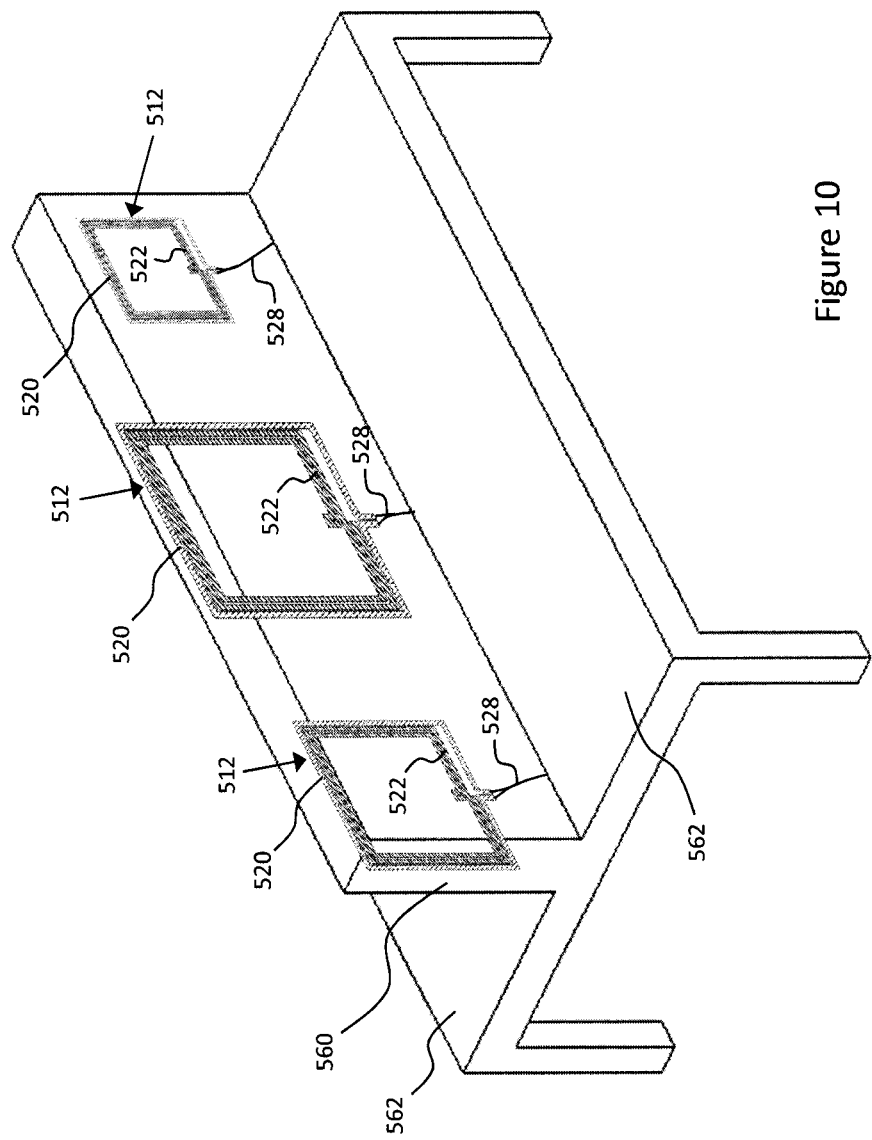
FIG. 10 illustrates a perspective view of an implementation of a transmitter of a WPT system according to the present disclosure.

The transmitters of the WPT systems of the present disclosure may also be implemented in any number of ways. For example, FIG. 10, illustrates an implementation of at least one transmitter 512 according to the present disclosure. The at least one transmitter 512 is substantially similar to the transmitter 12 of FIGS. 1 and 2 and the transmitter 112 of FIGS. 3-6B, and therefore like reference numerals preceded with "5" are used to indicate like aspects, processes or functions, and the description above directed to aspects, processes or functions thereof (and the alternative embodiments thereof) equally applies to the at least one transmitter 512. As shown in FIG. 10, the at least one transmitter 512 may be implemented in a support structure 560 coupled to support members or surfaces 562 on opposing sides of the at least one transmitter 512 and the support structure 560. The support structure 560 and the support members 562 may be a movable structure or a substantially fixed structure. For example, the support structure 560, support members 562 and the at least one transmitter 512 may form a wireless power transfer kiosk. As another example, the support structure 560, support members 562 and the at least one transmitter 512 may form a wireless power transfer table-top or desk-top station. In some embodiments, the support structure 560, support members 562 and the at least one transmitter 512 may be part of a WPT system for use with receivers (not shown) as described herein. For example, such a WPT system may include a plurality of receivers configured to operate with the at least one transmitter 512, as described above. Such a supply of receivers may allow users to couple or connect a receiver to their electronic device that does not include such a receiver to wirelessly recharge the battery thereof via the at least one transmitter 512.

As shown in FIG. 10, a plurality of transmitters 512 may be provided within or coupled to the support structure 560 for wireless charging of a variety of devices including corresponding receivers (not shown), as described above. As also shown in FIG. 10, the plurality of transmitters 512 may be sized and/or shaped differently to substantially match or at least approximate the size and/or shape of a variety of differing corresponding receivers, such as a variety of receivers coupled to devices of varying sizes and/or shapes. As discussed above, a transmitter and a receiver of substantially the same size and shape (and otherwise alike) may include a substantially high power transfer efficiency. To further ensure efficient power transfer from the plurality of transmitters 512 to corresponding devices incorporating receivers, the support members or surfaces 562 may be configured to substantially align a receiver of device positioned thereon with a corresponding transmitter 512 and/or orient a receiver of a device positioned thereon substantially parallel with a corresponding transmitter 512. For example, the support structure 560 and/or the support members 562 may include a visual and/or tactile indication associated with at least one transmitter 12 indicating the type of device or receiver, the location of a device on the support surface 562 and/or the orientation of the device on the support surface 562 that ensures efficient power transfer thereto via the associated transmitter 512.

In addition, many modifications may be made to adapt a particular aspect, function or material to the teachings of the various embodiments without departing from their scope. While any dimensions and/or types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably connected" is used herein to refer to both connections resulting from separate, distinct components being directly or indirectly coupled and components being integrally formed (i.e., monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A wireless power transfer system, comprising:
a transmitter and at least one receiver configured to magnetically couple to each other, comprising a coupled transmitter and receiver;
wherein the transmitter is comprised of two or more coils including at least a driver coil and a transmitter coil, wherein the driver coil and transmitter coil are configured to magnetically couple to each other, comprising a coupled driver coil and transmitter coil, and arranged within a first plane, wherein the coupled driver coil and transmitter coil are tuned to resonate at two different frequencies of a first set of frequencies, and wherein the transmitter is configured to resonate at a third different frequency of the first set of frequencies; and
the at least one receiver comprised of two or more coils including at least a load coil and a receiver coil, wherein the load coil and receiver coil are configured to magnetically couple to each other, comprising a coupled load coil and receiver coil, and arranged within a second plane, wherein the coupled load coil and receiver coil are tuned to resonate at two different frequencies of a second set of frequencies, wherein the at least one receiver is configured to resonate at a third different frequency of the second set of frequencies, and wherein the coupled transmitter and receiver of the wireless power transfer system is further configured to resonate at a system operating frequency that is different from frequencies of the first and second sets of frequencies;
wherein a coupling coefficient of the coupled driver coil and transmitter coil is greater than or equal to 0.1, and wherein a coupling coefficient of the coupled load coil and receiver coil is greater than or equal to 0.1, and wherein the transmitter and the at least one receiver are magnetically coupled to each other and tuned such that a coupling coefficient therebetween is less than 0.2, and such that the wireless power transfer system effectuates wireless power transfer from the transmitter to the at least one receiver.

2. The system of claim 1, wherein the at least one receiver comprises at least a first receiver and a second receiver, and wherein each receiver may be disposed and arranged within its own respective second plane in relation to the transmitter.

3. The system of claim 2, wherein the first receiver is positioned in the first plane at a distance of up to two times a largest diameter of the driver coil, and wherein the second receiver is positioned on an opposing side of the transmitter to the first receiver, in the second plane at a distance of up to two times the largest diameter of the driver coil, and wherein wireless power transfer is effectuated using magnetic fields on opposing sides of the transmitter.

4. The system of claim 3, wherein the first plane and the second plane may either one or both be substantially parallel to a plane of the transmitter.

5. The system of claim 1, wherein the transmitter and the at least one receiver are magnetically coupled and tuned such that the coupling coefficient therebetween is within the range of 0.05 to 0.1.

6. The system of claim 1, wherein at least one of the driver coil, the transmitter coil, the load coil or the receiver coil is formed of a multi-turn planar spiral coil or a single-turn planar coil.

7. The system of claim 1, wherein the driver coil and the transmitter coil are arranged concentrically, and the load coil and the receiver coil of the at least one receiver are arranged concentrically.

8. The system of claim 1, wherein at least one of the driver coil, the transmitter coil, the load coil and the receiver coil includes at least one capacitor or chip inductor coupled thereto, and wherein the at least one capacitor or chip inductor comprises a tunable mechanism configured to tune a resonance frequency of a respective coupled coil.

9. The system of claim 1, wherein the system operating frequency is automatically tuned to match the frequency of an oscillating electric current supplied to the transmitter.

10. The system of claim 9, wherein the system is configured to detect and determine respective distances between the transmitter and at least a first receiver and at least a second receiver, and wherein the system is further configured to tune one or more of the transmitter coil, the driver coil, the receiver coil and the load coil of the first receiver and the receiver coil and the load coil of the second receiver based on the respective distances between the transmitter, the first receiver and the second receiver.

11. The system of claim 1, wherein the system tunes one or more of the transmitter coil, the driver coil, the receiver coil and the load coil of the first receiver and the receiver coil and the load coil of the second receiver such that the system operating frequency substantially matches a frequency of an oscillating electric current supplied to the driver coil.

12. The system of claim 10, further comprising an oscillating electric current applied to the driver coil of the transmitter, wherein the electric current oscillates at a frequency and the system operating frequency is configured to match the frequency of the oscillating electric current, wherein the driver coil and the transmitter coil are tuned to resonate at different frequencies, each different than a transmitter operating resonance frequency, and wherein the load coil and the receiver coil are tuned to resonate at different frequencies, each different than a receiver operating resonance frequency, and wherein the transmitter and the at least one receiver are tuned to resonate at different frequencies, each different than the system operating resonance frequency.

13. The system of claim 1, wherein a difference between one or more resonance frequencies of the driver coil, the transmitter coil, the load coil and the receiver coil, a transmitter operating resonance frequency, a receiver operating resonance frequency, and a system operating resonance frequency may be at least within 5% of the lower of the frequencies or within at least about 0.5 MHz.

14. The system of claim 1, wherein the transmitter may be attached to or disposed within a structure, such as fixed wall member or other substantially fixed structure, and wherein the transmitter is configured to transmit power to receivers on either side of the wall.

15. The system of claim 14, wherein the transmitter is embedded within a vertical divider between two sides of a table or counter.

16. The system of claim 14, wherein the wall or vertical divider within which the transmitter is embedded includes positioning members configured to align a device including a receiver to achieve optimal coupling with the transmitter and maximal power transfer efficiency.

17. The system of claim 1, wherein a first receiver and a second receiver are either fixed to or configured to removably attach to a respective electronic device and to electrically connect to a battery of the electronic device to transfer power thereto via resonant inductive coupling of the first and second receivers and the transmitter.

18. The system of claim 17, wherein the first receiver and the second receiver are fixed to a respective electronic device via a planar or sheet-like attachment member, which is coupled to at least the load coil, the receiver coil, and at least one capacitor thereof and which includes a material or substance that adheres to a respective electronic device.

19. A constellation of wireless power receivers composed of at least one receiver, each receiver of the constellation of the wireless power receivers configured to supply electrical current to an electronic device via wireless power transfer from a transmitter and wherein each receiver of the constellation of the wireless power receivers comprises:

two or more coils including at least a load coil and a receiver coil, arranged along a first plane and configured to magnetically couple to each other, comprising a coupled load coil and receiver coil with a coupling coefficient greater than or equal to 0.1, the load coil and the receiver coil being tuned to resonate at two different frequencies of a first set of frequencies, and wherein the at least one receiver of the constellation of the wireless power receivers is configured to resonate at a third different frequency of the first set of frequencies, wherein each receiver of the constellation of the wireless power receivers is configured to magnetically couple to the transmitter, comprising a coupled receiver and transmitter, wherein the transmitter comprises two or more coils including at least a driver coil and a transmitter coil, arranged along a second plane and configured to magnetically couple to each other, comprising a coupled driver coil and transmitter coil with a coupling coefficient greater than or equal to 0.1, the driver coil and transmitter coil being tuned to resonate at two different frequencies of a second set of frequencies, and wherein the transmitter is configured to resonate at a third different frequency of the second set of frequencies, and wherein the coupled receiver and transmitter is further configured to resonate at a system operating frequency different from frequencies of the first and second sets of frequencies;

wherein the at least one receiver and the transmitter are tuned such that a coupling coefficient therebetween is less than 0.2 and such that the transmitter effectuates wireless power transfer to the at least one receiver.

20. A transmitter configured to resonantly magnetically-induce an electrical current in at least one receiver, having an electrical connection to an electronic device and configured to supply the electrical current to the electronic device via the electrical connection, wherein the transmitter comprises:

two or more coils including at least a driver coil and a transmitter coil, arranged along a first plane and configured to magnetically couple to each other, comprising a coupled driver coil and transmitter coil with a coupling coefficient greater than or equal to 0.1, the driver coil and the transmitter coil being tuned to resonate at two different frequencies of a first set of frequencies, and wherein the transmitter is configured to resonate at a third different frequency of the first set of frequencies, wherein the transmitter is configured to magnetically couple to at least one receiver, comprising a coupled transmitter and receiver, wherein the at least one receiver comprises two or more coils including at least a load coil and a receiver coil, arranged along a second plane and configured to magnetically couple to each other, comprising a coupled load coil and receiver coil with a coupling coefficient greater than or equal to 0.1, the load coil and receiver coil being tuned to resonate at two different frequencies of a second set of frequencies, and wherein the at least one receiver is configured to resonate at a third different frequency of the second set of frequencies, and wherein the coupled transmitter and receiver is further configured to resonate at a system operating frequency different from frequencies of the first and second sets of frequencies;

wherein the transmitter and the at least one receiver are tuned such that a coupling coefficient therebetween is less than 0.2 and such that the transmitter effectuates wireless power transfer to the at least one receiver.

* * * * *